(No Model.)

F. EPHRAIM.

PIPE FOR FLOORING, CEILING, AND OTHER BUILDING PURPOSES.

No. 333,119. Patented Dec. 29, 1885.

WITNESSES:
C. Neveux
C. Sedgwick

INVENTOR:
F. Ephraim
BY Munn & Co.
ATTORNEYS.

UNITED STATES PATENT OFFICE.

FERDINAND EPHRAIM, OF SAN FRANCISCO, CALIFORNIA.

PIPE FOR FLOORINGS, CEILINGS, AND OTHER BUILDING PURPOSES.

SPECIFICATION forming part of Letters Patent No. 333,119, dated December 29, 1885.

Application filed May 13, 1885. Serial No. 165,316. (No model.)

*To all whom it may concern:*

Be it known that I, FERDINAND EPHRAIM, a resident of the city and county of San Francisco, and State of California, have invented a new and useful Improvement in Pipes for Floorings, Ceilings, and other Building, &c., Purposes, of which the following is a full, clear, and exact description.

This invention, which is designed as a substitute for wood in structures of various kinds, but more especially for the floors, ceilings, or walls of fire-proof and other buildings, consists in iron or other pipes of special construction, whereby any number of pipes may be arranged parallel with each other side by side, and be united or made to match or interlock with one another along their longitudinal exterior surfaces, and are made to support one another at their sides or throughout their length, substantially as hereinafter described and claimed.

Reference is to be had to the accompanying drawings, forming a part of this specification, in which similar letters of reference indicate corresponding parts in all the figures.

Figure 1:
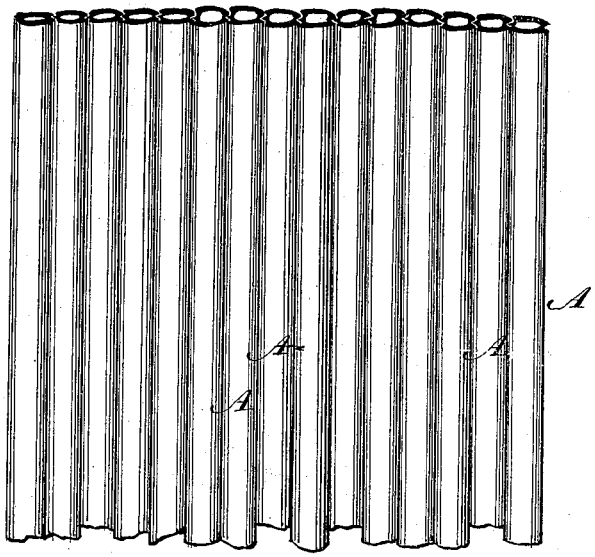
Figure 2:
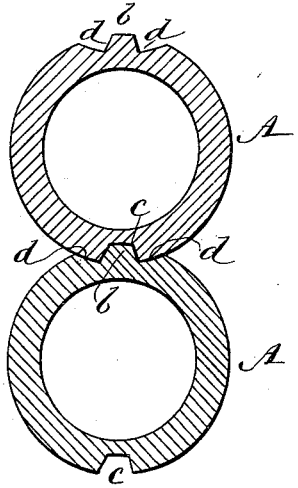
Figure 3:
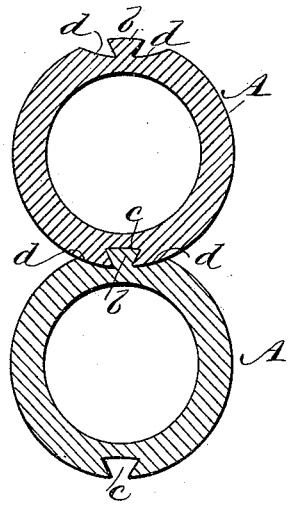
Figure 4:
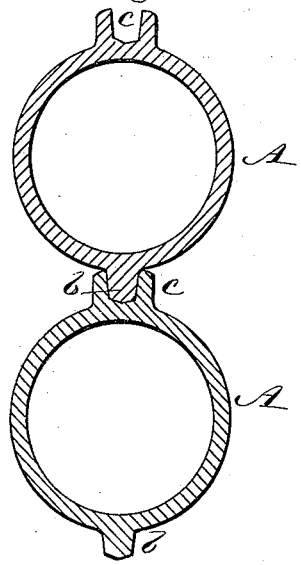

Figure 1 represents a face view of a series of pipes, which may constitute the portion of a floor, ceiling, or wall of a building, united in accordance with my invention; and Figs. 2, 3, and 4 are transverse sections of pipes in pairs, embodying the invention under different modifications of construction.

A A indicate iron pipes (wrought or cast) of any desired length and diameter, provided along their exterior surfaces, which may be smooth, with tongues and grooves—that is to say, with a longitudinal tongue on their one side and a longitudinal groove or socket on their opposite side—for establishing a parallel union and connection of the pipes, and for making the pipes support one another at their sides or throughout their length. These tongues and grooves may be of different shapes in transverse section, and may either be integral with the pipes or separately applied; but usually they will be formed on and in the pipes themselves. Furthermore, said tongue-and-groove portions may either be within the exterior surfaces of the pipes or project therefrom.

Figs. 2 and 3 show the tongues and grooves as within the exterior surfaces of the pipes, and Fig. 4 as arranged on the outside of them. In Fig. 2 the tongues *b* and grooves or sockets *c* are made beveling on their sides, and with seating-surfaces *d d* on opposite sides of the tongues to receive the adjacent pipe within them. The modification shown in Fig. 3 only differs from that shown in Fig. 2 by the tongues *b* and grooves or sockets *c* being of dovetail shape in transverse section, and the modification represented in Fig. 4 is similar to that shown in Fig. 2, excepting that the tongues *b* and grooved portions or sockets *c*, having either straight or sloping sides, project from the exterior of the pipes, and the bodies of the pipes are not brought into direct contact with or made to sit one within the other.

For ordinary building purposes the construction shown in Fig. 1 will generally answer, and when the pipes are fitted together by their longitudinal tongue-and-groove surfaces the pipes will be prevented from bulging out, and be made to retain their proper position. For ceiling and other purposes, however, the tongue-and-groove joint shown in Fig. 3 may be preferred, as the pipes will then be interlocked or inseparable laterally, making close seams; but in such jointed connection the pipes will have to be fitted together by sliding them endwise, one over or along the other, while in the construction shown in Figs. 2 and 4 the pipes may be united and made self-supporting by entering them one within the other from their sides.

It will be obvious that the shape of the longitudinal tongue and groove in or on the exterior of the pipes may be variously modified.

If desired to make the structure, as composed of the pipes united with each other, as described, air and water tight or fire-proof, asbestus, fire-proof paint, clay, or any other suitable material may be applied as a luting or coating to the tongues and grooves of the pipes.

Two or any greater number of pipes arranged parallel with each other may be united, as described, in accordance with this invention.

The pipes need not necessarily be circular in form, but will usually be made so.

The invention is not restricted to any particular use or purpose. Thus it may be utilized to advantage in the construction of wagons, iron safes, stoves, and various other articles or structures, besides building purposes.

Having thus described my invention, I claim as new and desire to secure by Letters Patent—

1. The pipes provided with longitudinal tongues and grooves in or on their exterior surfaces, and adapted to engage with one another when the pipes are in parallel relation with one another side by side, substantially as specified.

2. A pipe for building purposes having a longitudinal tongue in or on one side and a longitudinal groove or socket in or on the opposite sides of its exterior surface, essentially as herein set forth.

3. The combination of a series of iron or other metal pipes arranged side by side in parallel relation with each other, and provided with matching or interlocking tongues and grooves in or on and along their exterior surfaces, substantially as specified.

4. A pipe for building purposes having a longitudinal tongue of dovetail shape in transverse section on its one side and a longitudinal groove of corresponding shape on the opposite side of its exterior surface, essentially as described.

FERDINAND EPHRAIM.

Witnesses:
JOSEPH B. TOPLITZ,
HENRY WOLFSOHN.